United States Patent
Hanai et al.

(10) Patent No.: US 9,251,117 B2
(45) Date of Patent: Feb. 2, 2016

(54) RECONFIGURABLE CIRCUIT WITH SUSPENSION CONTROL CIRCUIT

(75) Inventors: Takashi Hanai, Yokohama (JP); Shinichi Sutou, Yokohama (JP)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 1019 days.

(21) Appl. No.: 12/723,320

(22) Filed: Mar. 12, 2010

(65) Prior Publication Data

US 2010/0257335 A1 Oct. 7, 2010

(30) Foreign Application Priority Data

Apr. 3, 2009 (JP) .................................. 2009-091017

(51) Int. Cl.
*G06F 9/30* (2006.01)
*G06F 15/78* (2006.01)
*G06F 9/38* (2006.01)

(52) U.S. Cl.
CPC .......... *G06F 15/7867* (2013.01); *G06F 9/3897* (2013.01)

(58) Field of Classification Search
None
See application file for complete search history.

(56) References Cited

U.S. PATENT DOCUMENTS

| | | | |
|---|---|---|---|
| 6,275,924 B1 * | 8/2001 | Subash et al. ................. | 712/207 |
| 6,438,737 B1 * | 8/2002 | Morelli et al. ................... | 326/38 |
| 6,449,736 B1 * | 9/2002 | Matt et al. ....................... | 714/35 |
| 7,529,910 B2 | 5/2009 | Isobe | |
| 7,587,578 B2 | 9/2009 | Isobe | |
| 2006/0010306 A1 | 1/2006 | Saito et al. | |
| 2006/0190701 A1 * | 8/2006 | Tsunoda et al. ................ | 712/15 |
| 2007/0033369 A1 * | 2/2007 | Kasama et al. ............... | 711/170 |
| 2007/0186085 A1 * | 8/2007 | Yim et al. ...................... | 712/244 |
| 2008/0079459 A1 | 4/2008 | Kawano et al. | |

FOREIGN PATENT DOCUMENTS

JP 2006-031127 A 2/2006

OTHER PUBLICATIONS

Office Action issued Jan. 15, 2013 for Japanese Patent Application 2009-091017.

* cited by examiner

*Primary Examiner* — William B Partridge

(57) ABSTRACT

A reconfigurable circuit includes a reconfigurable arithmetic execution unit array including a plurality of arithmetic execution units and a network circuit to provide reconfigurable connections between the arithmetic execution units, a suspension control circuit configured to control suspension and resumption of operation of the reconfigurable arithmetic execution unit array, and a buffer circuit configured to temporarily store data supplied from an external source upon suspension of the operation of the reconfigurable arithmetic execution unit array and to supply the stored data to the reconfigurable arithmetic execution unit array upon resumption of the operation of the reconfigurable arithmetic execution unit array.

15 Claims, 13 Drawing Sheets

RECONFIGURABLE CIRCUIT WITH SUSPENSION CONTROL CIRCUIT

CROSS-REFERENCE TO RELATED APPLICATIONS

The present application is based upon and claims the benefit of priority from the prior Japanese Patent Application No. 2009-091017 filed on Apr. 3, 2009, with the Japanese Patent Office, the entire contents of which are incorporated herein by reference.

FIELD

The disclosures herein generally relate to logic circuits, and particularly relate to a reconfigurable circuit in which execution logic is reconfigurable.

BACKGROUND

A dynamic reconfigurable circuit (hereinafter referred to as a reconfigurable circuit) includes a plurality of arithmetic execution units and a network circuit, such that arithmetic instructions and connections between the arithmetic execution units through the network circuit are set in a reconfigurable manner according to configuration data. In a reconfigurable circuit, instructions applied to arithmetic execution units and connections between the arithmetic execution units may be changed (i.e., context switching) during its operation. This allows the arithmetic execution units to be shared in a time-division fashion, thereby reducing the scale of hardware of the entire circuit. Further, a reconfigurable circuit may perform a pipeline operation, and is thus suitable for needs in which a data stream is processed at high speed.

An external buffer memory may be connected to a reconfigurable circuit. Such a buffer may successively store computation results obtained by the reconfigurable circuit and successively supply data to the reconfigurable circuit clock by clock. The provision of an external buffer presents an issue regarding the exchange of data at the time the reconfigurable circuit suspends its computation. A reconfigurable circuit may suspend its computation when a context switching occurs. In such a case, the flip-flops of the reconfigurable circuit are also stopped and unable to load new data. If data is supplied from the external buffer while the computation of the reconfigurable circuit is suspended, the data (i.e., input data) that are supposed to be loaded end up not being loaded.

RELATED-ART DOCUMENT

[Patent Document 1] Japanese Laid-open Patent Publication No. 2006-31127

SUMMARY

According to an aspect of the embodiment, a reconfigurable circuit includes a reconfigurable arithmetic execution unit array including a plurality of arithmetic execution units and a network circuit to provide reconfigurable connections between the arithmetic execution units, a suspension control circuit configured to control suspension and resumption of operation of the reconfigurable arithmetic execution unit array, and a buffer circuit configured to temporarily store data supplied from an external source upon suspension of the operation of the reconfigurable arithmetic execution unit array and to supply the stored data to the reconfigurable arithmetic execution unit array upon resumption of the operation of the reconfigurable arithmetic execution unit array.

According to another aspect, a reconfigurable circuit system includes a reconfigurable circuit, and an external buffer for which the reconfigurable circuit performs a data read operation and a data write operation, wherein the reconfigurable circuit includes a reconfigurable arithmetic execution unit array including a plurality of arithmetic execution units and a network circuit to provide reconfigurable connections between the arithmetic execution units, a suspension control circuit configured to control suspension and resumption of operation of the reconfigurable arithmetic execution unit array, and a buffer circuit configured to temporarily store data supplied from the external buffer upon suspension of the operation of the reconfigurable arithmetic execution unit array and to supply the stored data to the reconfigurable arithmetic execution unit array upon resumption of the operation of the reconfigurable arithmetic execution unit array.

According to another aspect, a method of controlling a reconfigurable circuit includes suspending an operation of a reconfigurable arithmetic execution unit array including a plurality of arithmetic execution units and a network circuit to provide reconfigurable connections between the arithmetic execution units, disabling a data access request from the reconfigurable arithmetic execution unit array to an external resource simultaneously with the suspension of the operation of the reconfigurable arithmetic execution unit array, storing, in a buffer, data supplied from the external resource after the suspension of the operation of the reconfigurable arithmetic execution unit array such that the data stored in the buffer is equal in number to a number indicative of a read latency of the external resource, and supplying the stored data to the reconfigurable arithmetic execution unit array upon resumption of the operation of the reconfigurable arithmetic execution unit array.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the present invention will be described with reference to the accompanying drawings.

Figure 1:
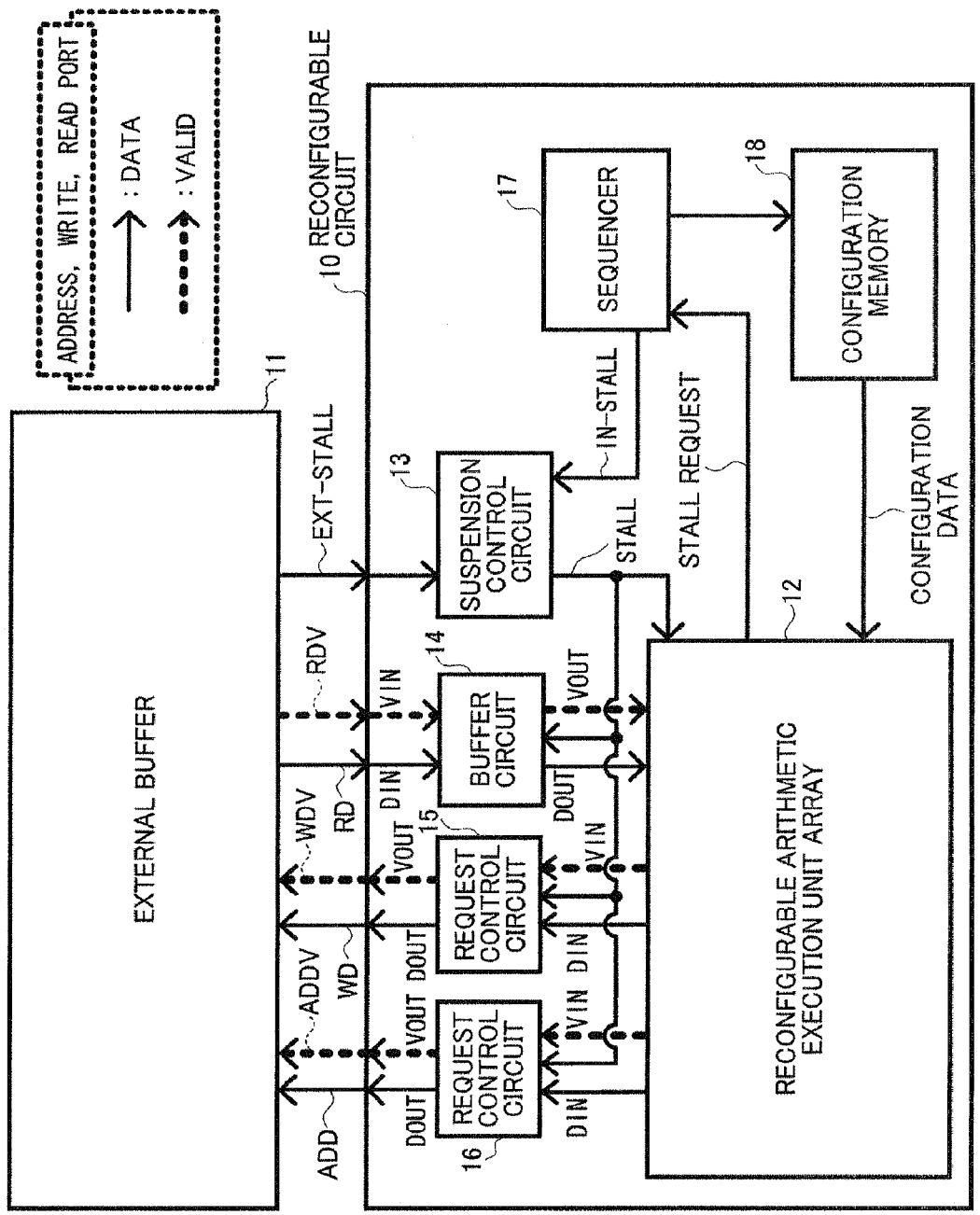
FIG. 1 is a drawing illustrating an example of the configuration of a reconfigurable circuit system.

FIG. 1 is a drawing illustrating an example of the configuration of a reconfigurable circuit system. The reconfigurable circuit system illustrated in FIG. 1 includes a reconfigurable circuit 10 and an external buffer 11. The reconfigurable circuit 10 supplies address data indicative of an address and write data to the external buffer 11 to write the write data to the external buffer 11 at the specified address. The reconfigurable circuit 10 supplies address data indicative of an address to the external buffer 11 to read data from the external buffer 11 at the specified address. The external buffer 11 is a resource having a data storing function provided outside the reconfigurable circuit 10, and may be a memory device such as a DRAM (Dynamic Random Access Memory). The specifications of the external buffer 11 will be described later in detail.

The reconfigurable circuit 10 includes a reconfigurable arithmetic execution unit array 12, a suspension control circuit 13, a buffer circuit 14, a request control circuit 15, a request control circuit 16, a sequencer 17, and a configuration memory 18. The reconfigurable arithmetic execution unit array 12 includes a plurality of arithmetic execution units and a network circuit to provide reconfigurable connections between the arithmetic execution units. Arithmetic instructions contained in configuration data specify operations performed by the arithmetic execution units. Connection data contained in the configuration data specify connections between the arithmetic execution units. The configuration data is stored in the configuration memory 18. From a plurality of configuration data pieces stored in the configuration memory 18, the sequencer 17 selects a configuration data piece indicative of a current operation type of the reconfigurable arithmetic execution unit array 12. The configuration data piece selected by the sequencer 17 is supplied to the reconfigurable arithmetic execution unit array 12, so that the reconfigurable arithmetic execution unit array 12 operates according to the operation type corresponding to the configuration data. The sequencer 17 successively selects configuration data pieces for provision to the reconfigurable arithmetic execution unit array 12, thereby successively updating the type of operation (i.e., contexts) of the reconfigurable arithmetic execution unit array 12.

The suspension control circuit 13 controls the suspension and resumption of the reconfigurable arithmetic execution unit array 12. The sequencer 17 produces an internal stall request IN-STALL that is a stall request (i.e., suspension request) generated inside the reconfigurable circuit 10, and applies the internal stall request IN-STALL to the suspension control circuit 13. Further, an external stall request EXT-STALL that is a stall request (i.e., suspension request) generated outside the reconfigurable circuit 10 and supplied from the external buffer 11 is applied to the suspension control circuit 13. The suspension control circuit 13 transmits a stall signal STALL in response to a request for suspension by the internal stall request IN-STALL or the external stall request EXT-STALL. The stall signal STALL is supplied to the reconfigurable arithmetic execution unit array 12, the buffer circuit 14, the request control circuit 15, and the request control circuit 16.

Figure 2:
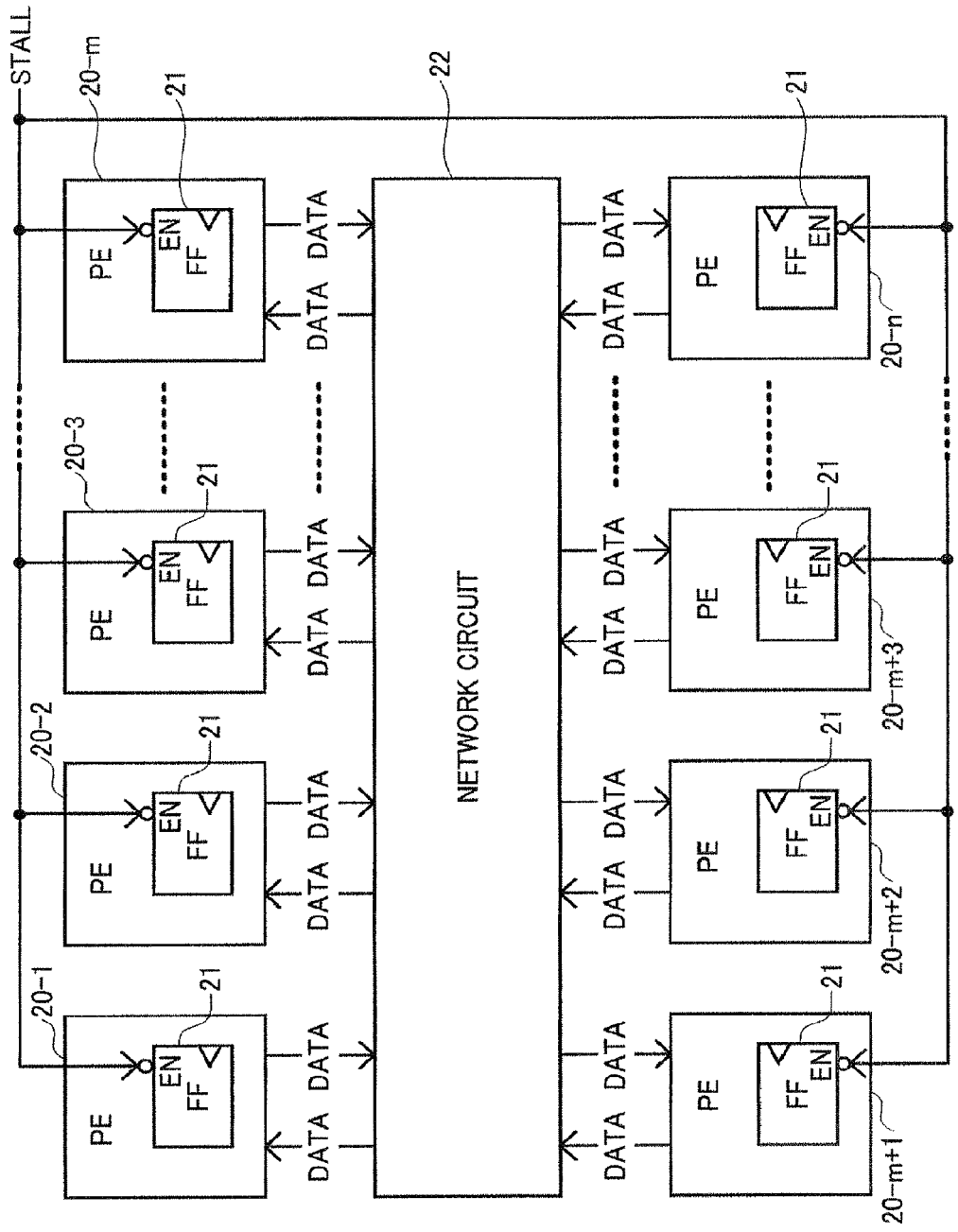
FIG. 2 is a drawing illustrating an example of the configuration of a reconfigurable arithmetic execution unit array.

FIG. 2 is a drawing illustrating an example of the configuration of the reconfigurable arithmetic execution unit array 12. The reconfigurable arithmetic execution unit array 12 illustrated in FIG. 2 includes n arithmetic execution units (i.e., processor elements PE) 20-1 through 20-n and a network circuit 22. The network circuit 22 connects between the arithmetic execution units 20-1 through 20-n in a reconfigurable manner. Arithmetic instructions contained in the configuration data specify operations performed by the arithmetic execution units 20-1 through 20-n. Connection data contained in the configuration data specify connections between the arithmetic execution units implemented by the network circuit 22. Any desired arithmetic operation may be performed by combining a counter, an adding and subtracting unit, a multiplier, and so on which are implemented by each of the arithmetic execution units 20-1 through 20-n. Operations performed inside the reconfigurable arithmetic execution unit array 12 may be fashioned in a pipeline configuration comprised of multiple stages, so that data processing is continuously performed clock by clock.

Each of the arithmetic execution units 20-1 through 20-n includes a flip-flop 21. For the sake of convenience, a single flip-flop 21 is illustrated in each arithmetic execution unit. In reality, however, a plurality of flip-flops 21 are included in each arithmetic execution unit. An enable terminal EN of each flip-flop 21 receives the stall signal STALL produced by the suspension control circuit 13. The assertion of the stall signal STALL causes the flip-flop 21 to suspend its data loading operation (i.e., data updating operation). With this arrangement, the operation of the reconfigurable arithmetic execution unit array 12 may be suspended while data indicative of intermediate computation results are stored in the arithmetic execution units 20-1 through 20-n. A subsequent negation (i.e., de-assertion) of the stall signal STALL then causes the operation of the reconfigurable arithmetic execution unit array 12 to resume its operation from the state in which suspension has occurred.

Figure 3:
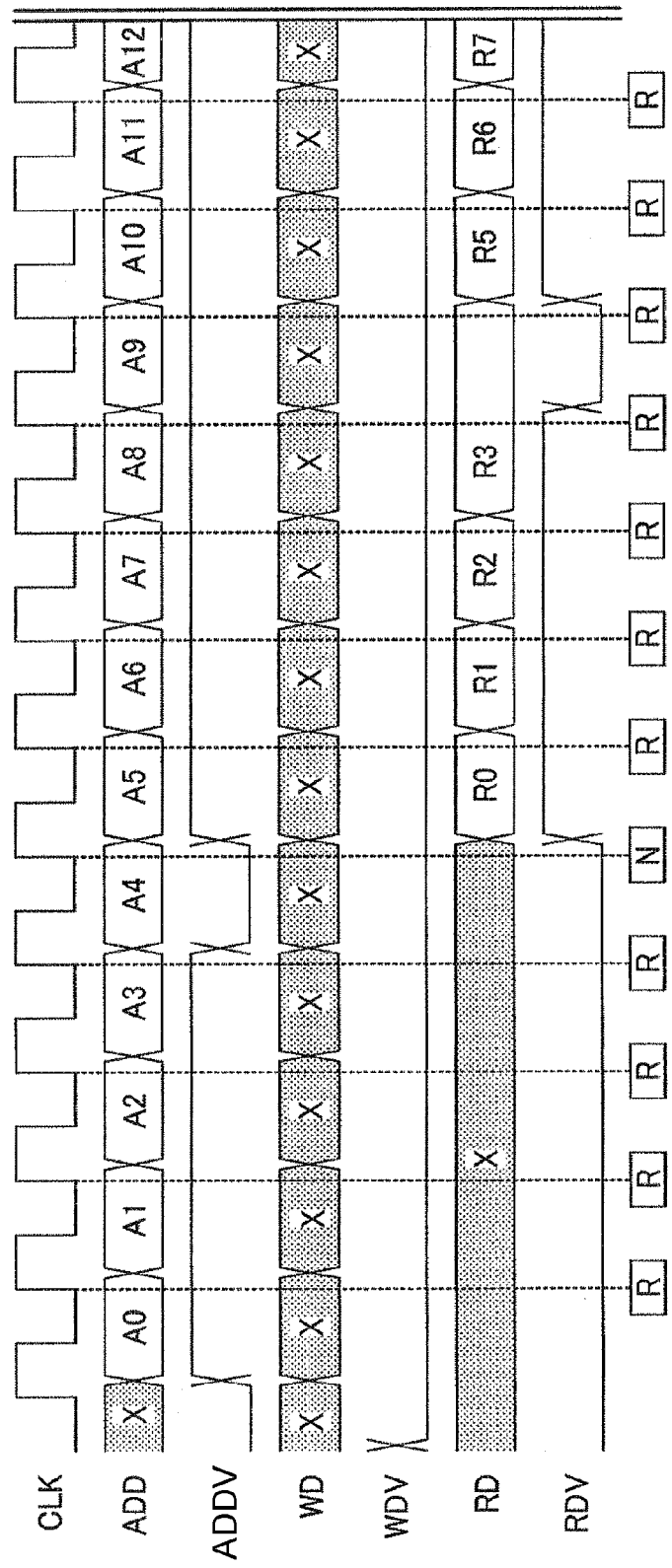
FIG. 3 is a drawing illustrating an operation performed at the time of read access with respect to an external buffer.
Figure 4:
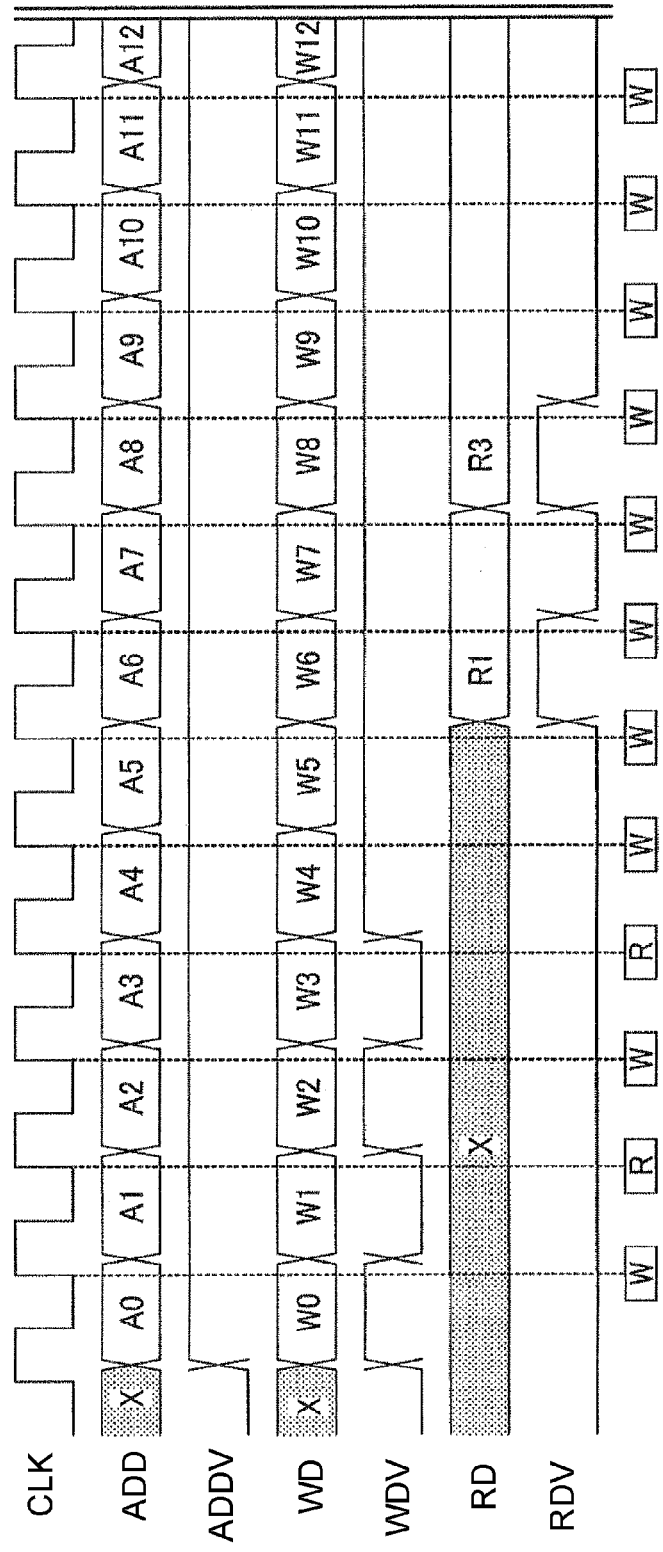
FIG. 4 is a drawing illustrating an operation performed at the time of write access with respect to the external buffer.

FIG. 3 is a drawing illustrating an operation performed at the time of read access with respect to the external buffer. FIG. 4 is a drawing illustrating an operation performed at the time of write access with respect to the external buffer. In the following, a detailed description will be given of the operation of the external buffer 11 by referring to FIG. 3 and FIG. 4.

Inputs into the external buffer 11 include an address ADD, an address valid flag ADDV, write data WD, and a write data valid flag WDV. Outputs from the external buffer 11 include read data RD and a read data valid flag RDV. Each data valid flag assumes a value indicative of whether the corresponding data is valid or invalid. The address data valid flag ADDV, for example, assumes a value indicating whether the address ADD, which can be either valid data or invalid data, is valid data or invalid data at present. In examples illustrated in FIG. 3 and FIG. 4, each data valid flag indicates a valid state of the corresponding data when it is 1, and indicates an invalid state of the corresponding data when its is 0. In FIG. 3, A0 through A3 are valid addresses, but A4 is an invalid address.

The external buffer 11 is placed in a nop state when the address data valid flag ADDV indicates an address invalid state, i.e., when ADDV is 0. Namely, the external buffer 11 performs no operation. Further, the external buffer 11 performs a read operation when the address is valid (i.e., ADDV=1), and, at the same time, write data is invalid (WDV=0). In the example illustrated in FIG. 3, the write data valid flag WDV is set to 0 all the time, so that a read operation is performed in all the cycles for which the address data valid flag ADDV indicates an address valid state. The letter "R" enclosed in a rectangle at the bottom of FIG. 3 indicates that a read operation is performed in a corresponding cycle. A clock signal CLK is illustrated at the top row. One read operation or one write operation is performed in one clock cycle.

The external buffer 11 performs a write operation when the address is valid (i.e., ADDV=1), and, at the same time, write data is valid (WDV=1). In the example illustrated in FIG. 4, the address is valid (i.e., ADDV=1), and, at the same time, write data is valid (WDV=1) in the cycles corresponding to the addresses A0, A2, A4 through A12, so that a write operation is performed in each of these cycles. The letter "w" enclosed in a rectangle at the bottom of FIG. 4 indicates that a write operation is performed in a corresponding cycle. The letter "R" enclosed in a rectangle indicates that a read operation is performed in a corresponding cycle.

The external buffer 11 produces read data upon the passage of a predetermined read latency following a read access request. In the examples illustrated in FIG. 3 and FIG. 4, the read latency is equal to 5 clock cycles. Namely, a read access request for the address A0 in FIG. 3, for example, results in the read data R0 being output 5 clock cycles later.

Figure 5:
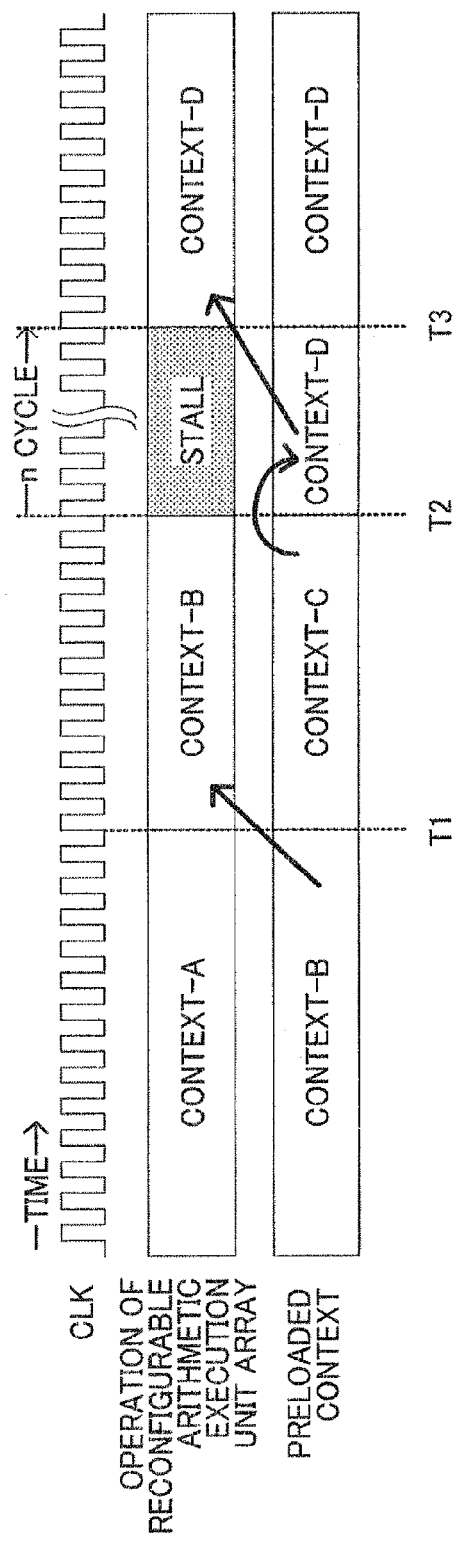
FIG. 5 is a drawing illustrating the suspension of operation associated with a context switching.

FIG. 5 is a drawing illustrating the suspension of operation associated with a context switching. As previously described, the reconfigurable circuit may change operations it executes by performing a context switching during operation. In order to eliminate a wait time for context switching, the reconfigurable arithmetic execution unit array 12 may preload configuration data from the configuration memory 18. In an example illustrated in FIG. 5, configuration data corresponding to a context B is preloaded while the reconfigurable arithmetic execution unit array 12 is operating in a context A. The configuration data that forms a basis for the operation of the reconfigurable arithmetic execution unit array 12 is switched at timing T1 from that of the context A to that of the context B, thus performing a context switching. After this, configuration data corresponding to a context C is preloaded while the reconfigurable arithmetic execution unit array 12 is operating in the context B.

A branching for context switching occurs at timing T2. At this branching, the context to be executed next is determined based on the results of computation performed by the reconfigurable arithmetic execution unit array 12. In this example, the configuration data corresponding to the context C has been preloaded. However, the branching process determines that the context to be executed next is a context D. Configuration data corresponding to the context D is thus loaded from the configuration memory 18 by using the n cycles of the clock signals CLX starting from the timing T2. During the period of context reloading (i.e., overwriting of the preloaded context), the operation of the reconfigurable arithmetic execution unit array 12 is preferably suspended. The reconfigurable arithmetic execution unit array 12 sends a stall request to the sequencer 17 as illustrated in FIG. 1 upon detecting that context reloading is to be performed. In response, the sequencer 17 applies the internal stall request IN-STALL to the suspension control circuit 13, so that the suspension control circuit 13 produces the stall signal STALL. In response to the stall signal STALL, the operation of the reconfigurable arithmetic execution unit array 12 is stalled (i.e., suspended) during the n cycles starting from T2 (illustrated as "STALL" in FIG. 5). Upon the completion of the preloading of configuration data corresponding to the context D, the configuration data forming a basis for the operation of the reconfigurable arithmetic execution unit array 12 is switched at timing T3 from that of the context B to that of the context D. In this manner, switching from the context B to the context D is performed.

Figure 6:
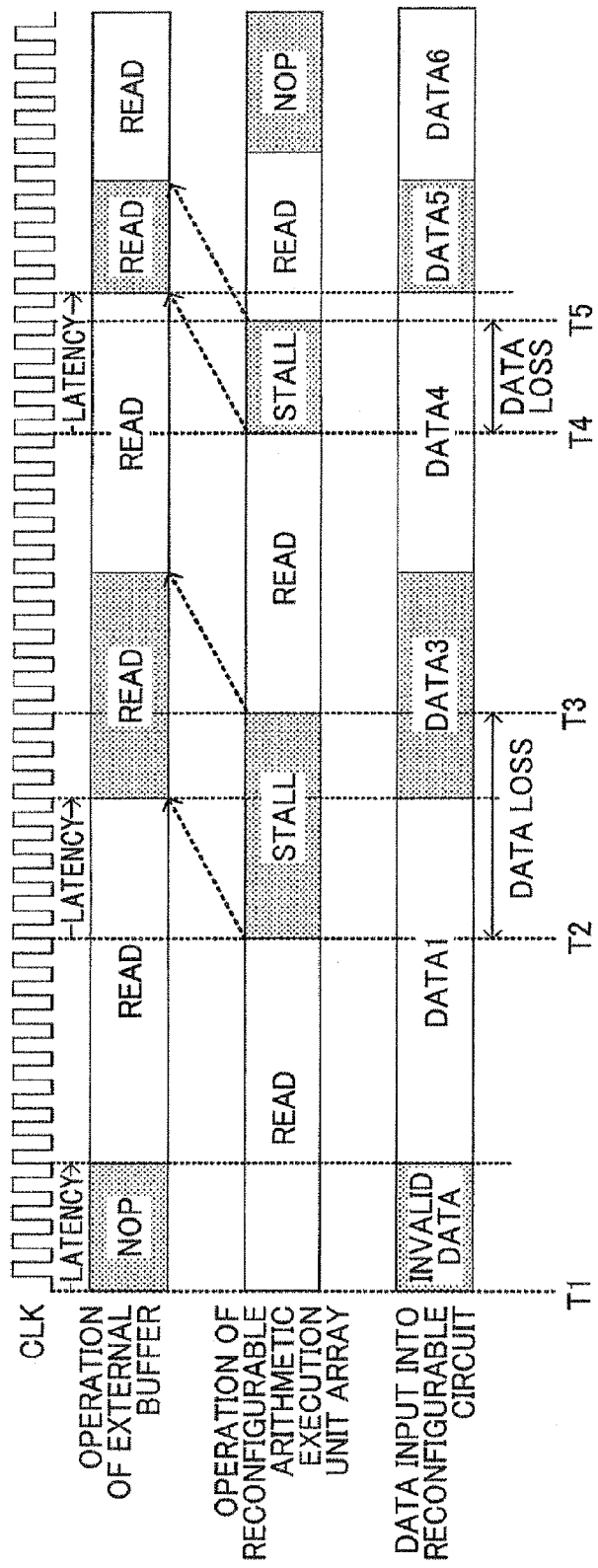
FIG. 6 is a drawing illustrating the problem associated with data reading from an external buffer when the operation of a reconfigurable arithmetic execution unit array is suspended.

FIG. 6 is a drawing illustrating the problem associated with data reading from an external buffer when the operation of the reconfigurable arithmetic execution unit array is suspended. The operation illustrated in FIG. 6 corresponds to a case in which an operation suspension occurs while the reconfigurable arithmetic execution unit array is reading the external buffer, and, yet, the read request continues to be asserted. As previously described, the operation of the reconfigurable arithmetic execution unit array comes to a halt by suspending the updating operation of the flip-flops provided inside the reconfigurable arithmetic execution unit array, and, then, this suspended state continues thereafter. Without a countermeasure, thus, a read request continues to be asserted as in the example illustrated in FIG. 6.

In row (a) of FIG. 6, a clock signal CLK is illustrated. As illustrated in row (c), the reconfigurable arithmetic execution unit array asserts a read request from timing T1 to timing T2. As illustrated in row (b), the external buffer supplies read data after a latency of 5 cycles. The data supplied by this read data supply operation are received as reconfigurable circuit input data DATA1 illustrated in row (d) of FIG. 6. As illustrated in row (c), the reconfigurable arithmetic execution unit array suspends its operation at timing T2, but the read request continues to be asserted. In response to the read request being asserted during the period of operation suspension, DATA3 is supplied from the external buffer to the reconfigurable circuit as input data after a latency of 5 cycles. Since the reconfigurable arithmetic execution unit array is in the suspended state from timing T2 to timing T3, the input data supplied during this period will be lost unless some countermeasure is taken. The loss of DATA3 does not pose a problem since this data is not the data intended by the reconfigurable arithmetic execution unit array to receive. DATA1, on the other hand, is not allowed to be lost. Similarly, when the reconfigurable arithmetic execution unit array suspends its operation from timing T4 to timing T5, a portion of read data DATA4 that is supplied during the period from timing T4 to timing T5 will be lost.

In order to obviate the shortcomings as described above, the reconfigurable circuit 10 illustrated in FIG. 1 includes the buffer circuit 14, the request control circuit 15, and the request control circuit 16. The buffer circuit 14 temporarily stores data supplied from the external buffer 11 during the period in which the operation of the reconfigurable arithmetic execution unit array 12 is suspended. Further, the buffer circuit 14 supplies the stored data to the reconfigurable arithmetic execution unit array 12 upon the resuming of operation of the reconfigurable arithmetic execution unit array 12. The request control circuit 15 serves to function as an access request disabling circuit to disable the supply of write data from the reconfigurable arithmetic execution unit array 12 to an external device during the period in which the operation of the reconfigurable arithmetic execution unit array 12 is suspended. The request control circuit 16 serves to function as an access request disabling circuit to disable the supply of address data from the reconfigurable arithmetic execution unit array 12 to an external device during the period in which the operation of the reconfigurable arithmetic execution unit array 12 is suspended.

Figure 7:
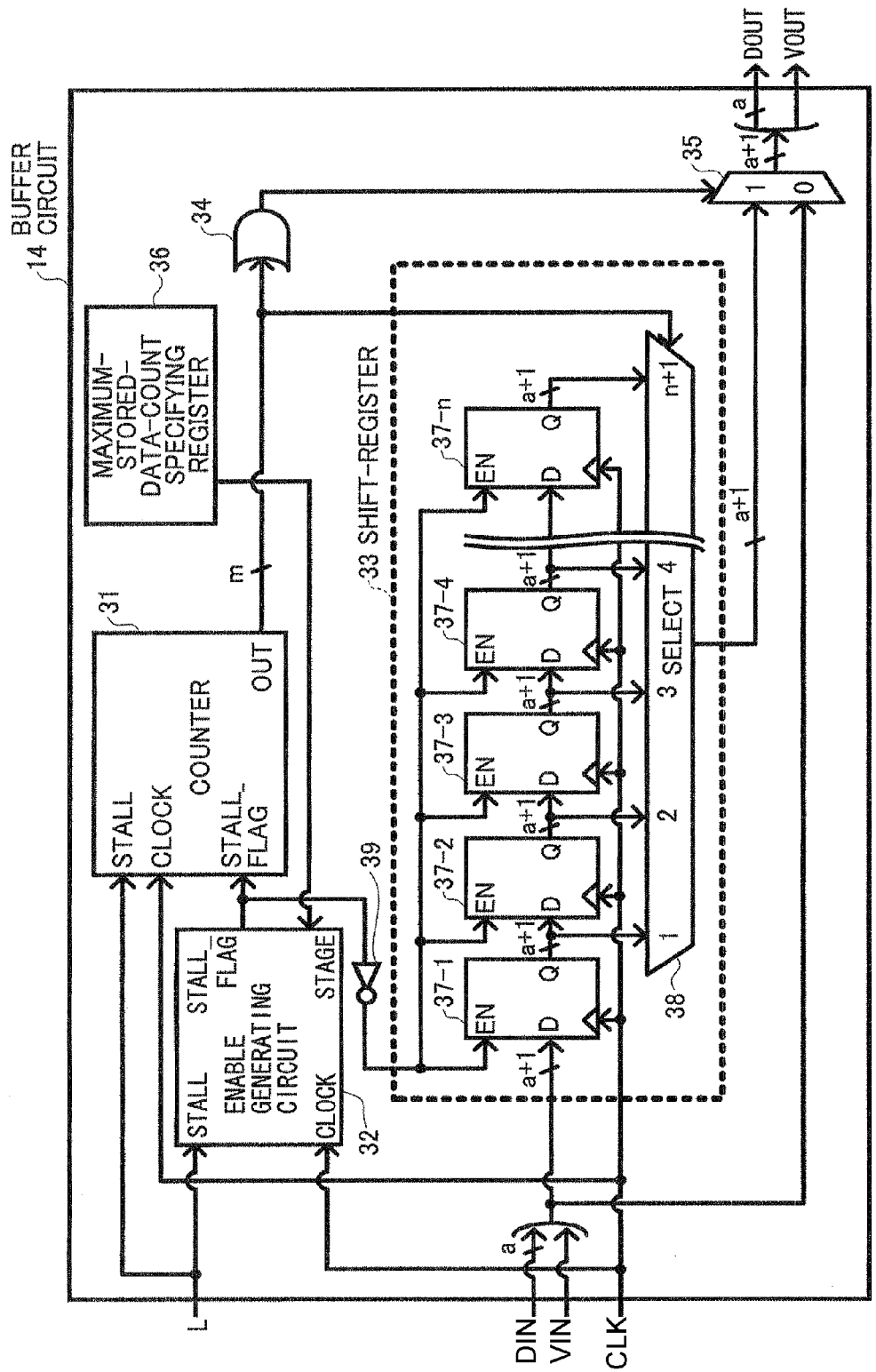
FIG. 7 is a drawing illustrating an example of the configuration of a buffer circuit.

FIG. 7 is a drawing illustrating an example of the configuration of the buffer circuit 14. The buffer circuit 14 includes a counter 31, an enable generating circuit 32, a tap-equipped shift-register 33, an OR gate 34, a selector 35, a maximum-stored-data-count specifying register 36, and an inverter 39. The tap-equipped shift-register 33 is configured to selectively output the stored data of a selected one of the flip-flops constituting a shift register, and includes cascade-connected flip-flops 37-1 through 37-$n$ and a selector 38. For the sake of convenience of illustration, one line of flip-flops 37-1 through 37-$n$ corresponding to one bit is illustrated. In reality, however, a+1 lines of flip-flops are provided when the input data is comprised of a+1 bits. In the example illustrated in FIG. 7, the input data applied to the buffer circuit 14 include a-bit data DIN which assume either a valid value or an invalid value, and further include a one-bit valid-state indicating data (i.e., flag) VIN to indicate whether the data DIN, which is either valid or invalid, is valid or invalid at present. One line of flip-flops is provided separately for each bit of the input data comprised of a+1 bits, so that a+1 lines of flip-flops are provided in total. The output data from the buffer circuit 14 include a-bit data DOUT which assume either a valid value or an invalid value, and further include a one-bit valid-state indicating data (i.e., flag) VOUT to indicate whether the data DOUT, which is either valid or invalid, is valid or invalid at present.

The buffer circuit 14 supplies data to the reconfigurable arithmetic execution unit array 12 in the first operation mode after the data has been temporarily stored in the buffer circuit 14 upon being supplied from the external buffer 11. Further, the buffer circuit 14 supplies data to the reconfigurable arithmetic execution unit array 12 in the second operation mode without temporarily storing the data that is supplied from the external buffer 11. The first operation mode is used when unread data still remains in the shift-register 33, and the second operation mode is used when no unread data remains in the shift-register 33. Switching between the first operation mode and the second operation mode is performed by controlling the selector 35 in response to whether the output count value of the counter 31 counting the number of unread data stored in the shift-register 33 is 0 or no less than 1. The selector 35 selects data supplied from the external buffer 11 for provision to the reconfigurable arithmetic execution unit array 12 when the output count value of the counter 31 is 0. The selector 35 selects data output from the shift-register 33 for provision to the reconfigurable arithmetic execution unit array 12 when the output count value of the counter 31 is no less than 1.

The shift-register 33 stores data equal in number to the stored value of the maximum-stored-data-count specifying register 36 by starting counting the data from the moment at which the operation of the reconfigurable arithmetic execution unit array 12 stops. The maximum-stored-data-count specifying register 36 stores a value indicative of the latency of the external buffer 11 as counted in units of clock cycles. The stored value of the maximum-stored-data-count specifying register 36 is supplied to the enable generating circuit 32.

Figure 13:
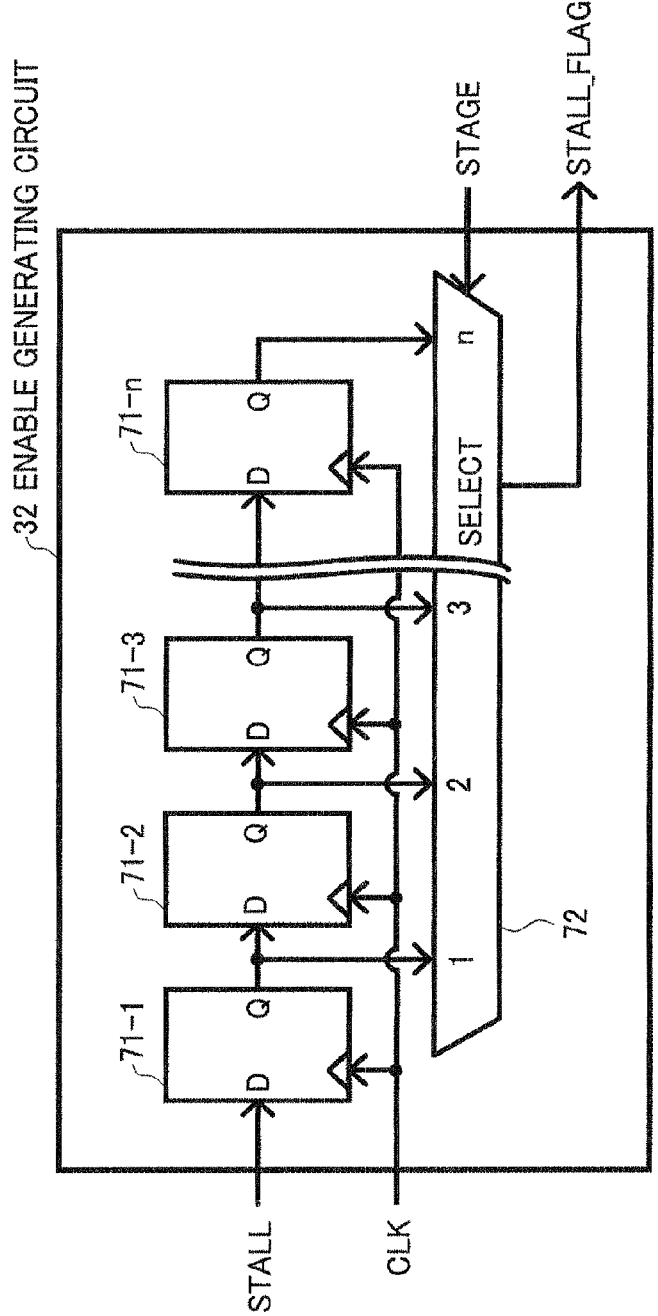
FIG. 13 is a drawing illustrating an example of the configuration of an enable generating circuit.

FIG. 13 is a drawing illustrating an example of the configuration of an enable generating circuit. The enable generating circuit 32 includes cascade-connected flip-flops 71-1 through 71-$n$ and a selector 72. The selector 72 selects the data of one of the flip-flops 71-1 through 71-$n$ situated at the position indicated by the stored value STAGE of the maximum-stored-data-count specifying register 36, and outputs the selected data as a stall flag signal STALL_FLAG. The enable generating circuit 32 serves to output the stall signal STALL as the stall flag signal STALL_FLAG after a delay equal to the number of cycles indicated by the stored value STAGE of the maximum-stored-data-count specifying register 36. Accordingly, the stall flag signal STALL_FLAG output from the enable generating circuit 32 is in a negated state during the above-noted number of cycles starting from the moment at which the operation of the reconfigurable arithmetic execution unit array 12 is suspended (i.e., the moment at which the stall signal STALL is first asserted). Namely, a count enable signal that is the logical inverse of the stall flag signal STALL_FLAG is in an asserted state during the above-noted period. In the case of a latency of 5 clock cycles, for example, 5 is stored in the maximum-stored-data-count specifying register 36. In this case, the count enable signal is in an asserted state during the period of 5 clock cycles starting from the moment at which the operation of the reconfigurable arithmetic execution unit array 12 comes to a halt. Accordingly, the shift-register 33 stores 5 data pieces (i.e., data for 5 clock cycles) counted from the moment at which the operation of the reconfigurable arithmetic execution unit array 12 is suspended, and thereafter stores no more data.

The shift-register 33 supplies to the reconfigurable arithmetic execution unit array 12 the data that is selected by the count value of the counter 31 from the data stored in the flip-flops 37-1 through 37-$n$. If the count value of the counter 31 is 4, for example, the selector 38 selects the stored data of the fourth flip-flop 37-4 for provision to the selector 35. Accordingly, the stored data of the fourth flip-flop 37-4 is supplied to the reconfigurable arithmetic execution unit array 12.

Figure 14:
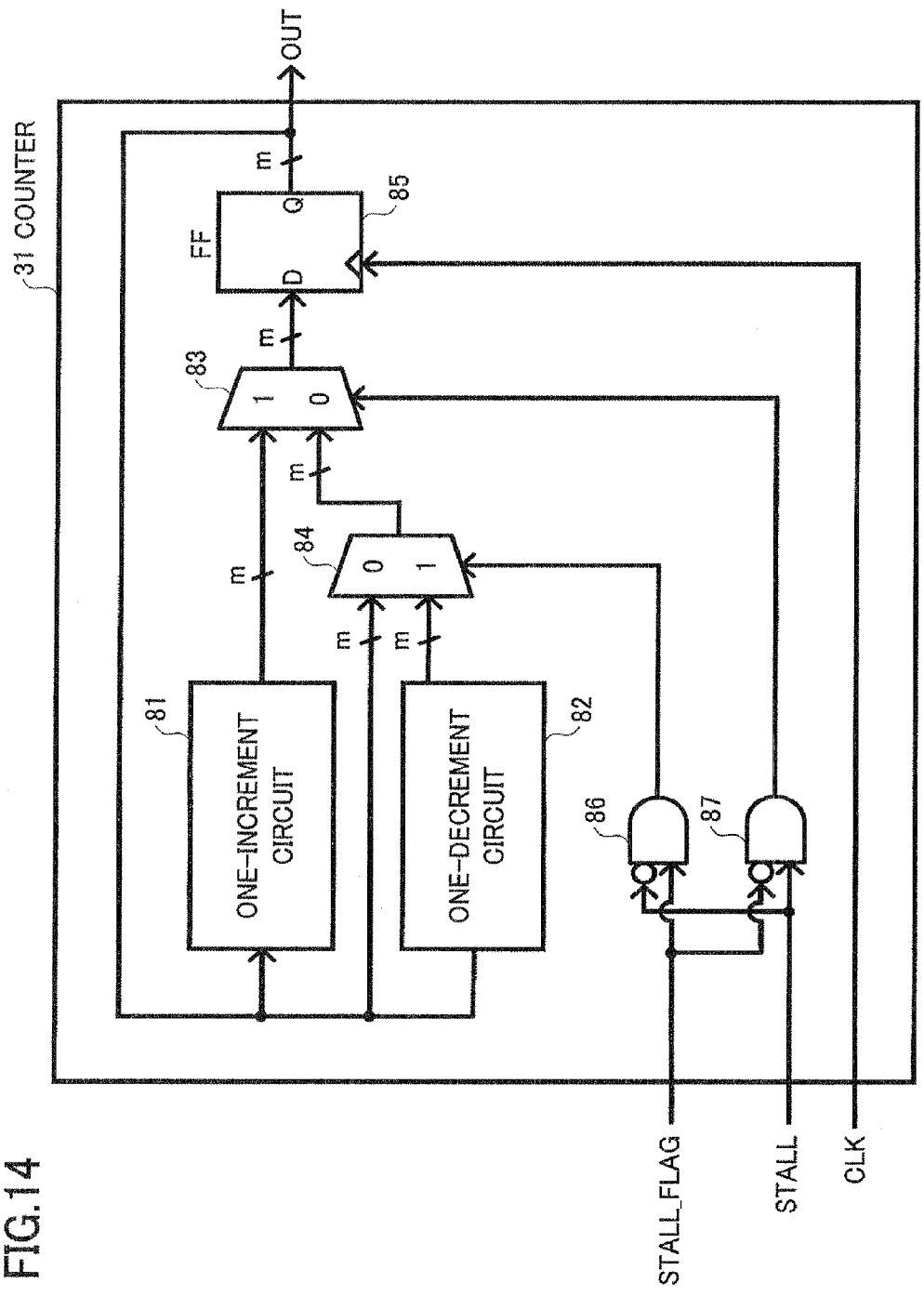
FIG. 14 is a drawing illustrating an example of the configuration of a counter.

FIG. 14 is a drawing illustrating an example of the circuit configuration of the counter 31. The counter 31 includes a one-increment circuit 81, a one-decrement circuit 82, a selector 83, a selector 84, a flip-flop 85, and AND gates 86 and 87. Each of the AND gates 86 and 87 has one input thereof being a negative logic and the other input thereof being a positive logic. The counter 31 counts up a count value in response to a clock CLK when the shift-register 33 performs a shift operation during the period in which the operation of the reconfigurable arithmetic execution unit array 12 is suspended. Namely, the counter 31 counts up the count value in synchronization with each pulse of the clock CLK when the stall signal STALL is asserted, and, at the same time, the stall flag signal STALL_FLAG is negated.

Further, the counter 31 maintains the current count value when the shift-register 33 performs no shift operation during the period in which the operation of the reconfigurable arithmetic execution unit array 12 is suspended. Namely, the counter 31 neither counts up nor counts down, and maintains the current count value without any change when the stall signal STALL is asserted, and, at the same time, the stall flag signal STALL_FLAG is also asserted.

The counter 31 counts down the count value in response to the clock CLK when the shift-register 33 performs no shift operation during the period in which the reconfigurable arithmetic execution unit array 12 is operating. Namely, the counter 31 counts down the count value in synchronization with each pulse of the clock CLK when the stall signal STALL is negated (i.e., de-asserted), and, at the same time, the stall flag signal STALL_FLAG is asserted.

Figure 8:
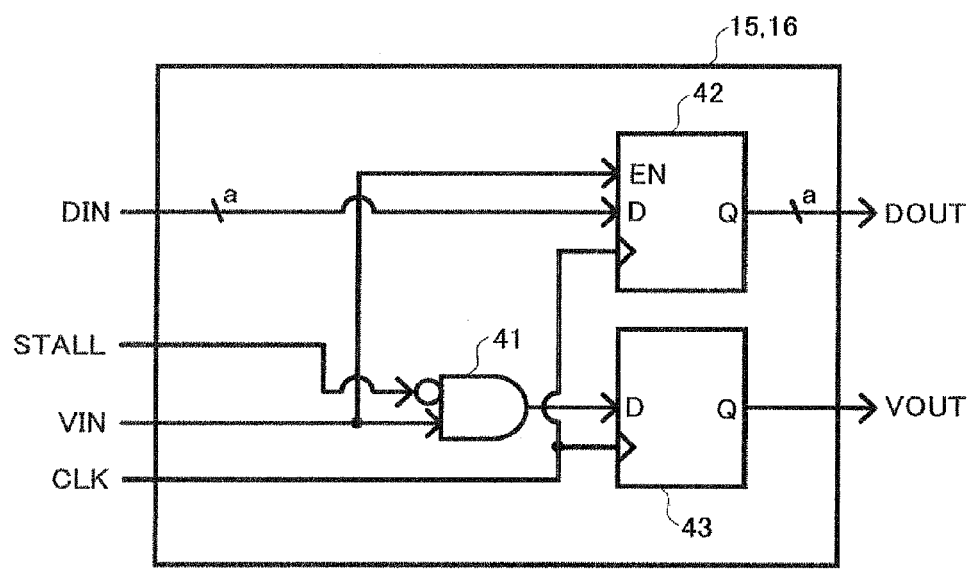
FIG. 8 is a drawing illustrating an example of the configuration of a request control circuit.

FIG. 8 is a drawing illustrating an example of the configuration of the request control circuit 15. The request control circuit 16 also has the configuration illustrated in FIG. 8. The request control circuit 15 (or 16) includes an AND gate 41 with one of its two inputs being a negative logic, a flip-flop 42, and a flip-flop 43. The input data applied to the request control circuit 15 (or 16) include a-bit data DIN which assume either a valid value or an invalid value, and further include a one-bit valid-state indicating data (i.e., flag) VIN to indicate whether the data DIN, which is either valid or invalid, is valid or invalid at present. The output data from the request control circuit 15 (or 16) include a-bit data DOUT which assume either a valid value or an invalid value, and further include a one-bit valid-state indicating data (i.e., flag) VOUT to indicate whether the data DOUT, which is either valid or invalid, is valid or invalid at present. In the case of the request control circuit 15, the input and output data is write data. In the case of the request control circuit 16, the input and output data is address data.

One flip-flop 42 is provided separately for each bit of the input and output data DIN and DOUT, except for the valid flag. In this example, the input and output data is comprised of a bits, so that a total of a flip-flops 42 are provided. The input data DIN is loaded into the flip-flop 42 in synchronization with the clock CLK when the valid-state indicating data VIN is asserted to indicate a valid state, and is output as the output data DOUT. When the valid-state indicating data VIN is negated to indicate an invalid state, the input data DIN is not loaded into the flip-flop 42, and does not appear as the output data DOUT.

The input valid-state indicating data VIN is loaded into the flip-flop 43 in synchronization with the clock CLK when the stall signal STALL is in a negated state (i.e., "0") to indicate a valid operation. In this case, the input valid-state indicating data VIN is output as the output valid-state indicating data VOUT. The output of the AND gate 41 is set to 0 when the stall signal STALL is in an asserted state (i.e., "1") to indicate the suspension of operation. In this case, the flip-flop 43 loads "0" in synchronization with the clock CLK, so that the value "0" indicating an invalid state is output as the output valid-state indicating data VOUT.

Figure 9:
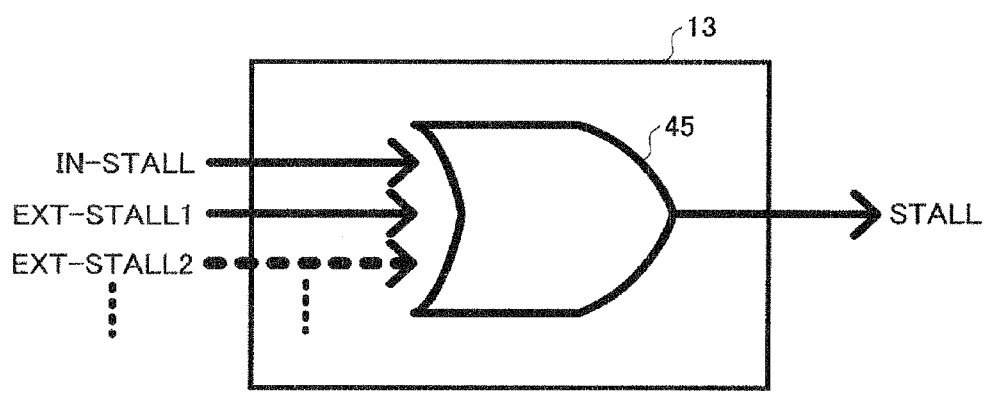
FIG. 9 is a drawing illustrating an example of the configuration of a suspension control circuit.

FIG. 9 is a drawing illustrating an example of the configuration of the suspension control circuit 13. The suspension control circuit 13 illustrated in FIG. 9 includes an OR circuit 45. The OR circuit 45 receives stall request signals corresponding to various causes such as the internal stall request IN-STALL, a first external stall request EXT-STALL1, a second external stall request EXT-STALL2, etc. The internal stall request IN-STALL is supplied from the sequencer 17. The first external stall request EXT-STALL may correspond to the external stall request EXT-STALL illustrated in FIG. 1, for example. The second external stall request EXT-STALL is not illustrated in FIG. 1. The suspension control circuit 13 illustrated in FIG. 9 is configured to cope with multiple external stall requests. The stall request signal is placed in an asserted state (i.e., "1") when any one or more of the received stall request signals is placed in an asserted state (i.e., "1").

Figure 10:
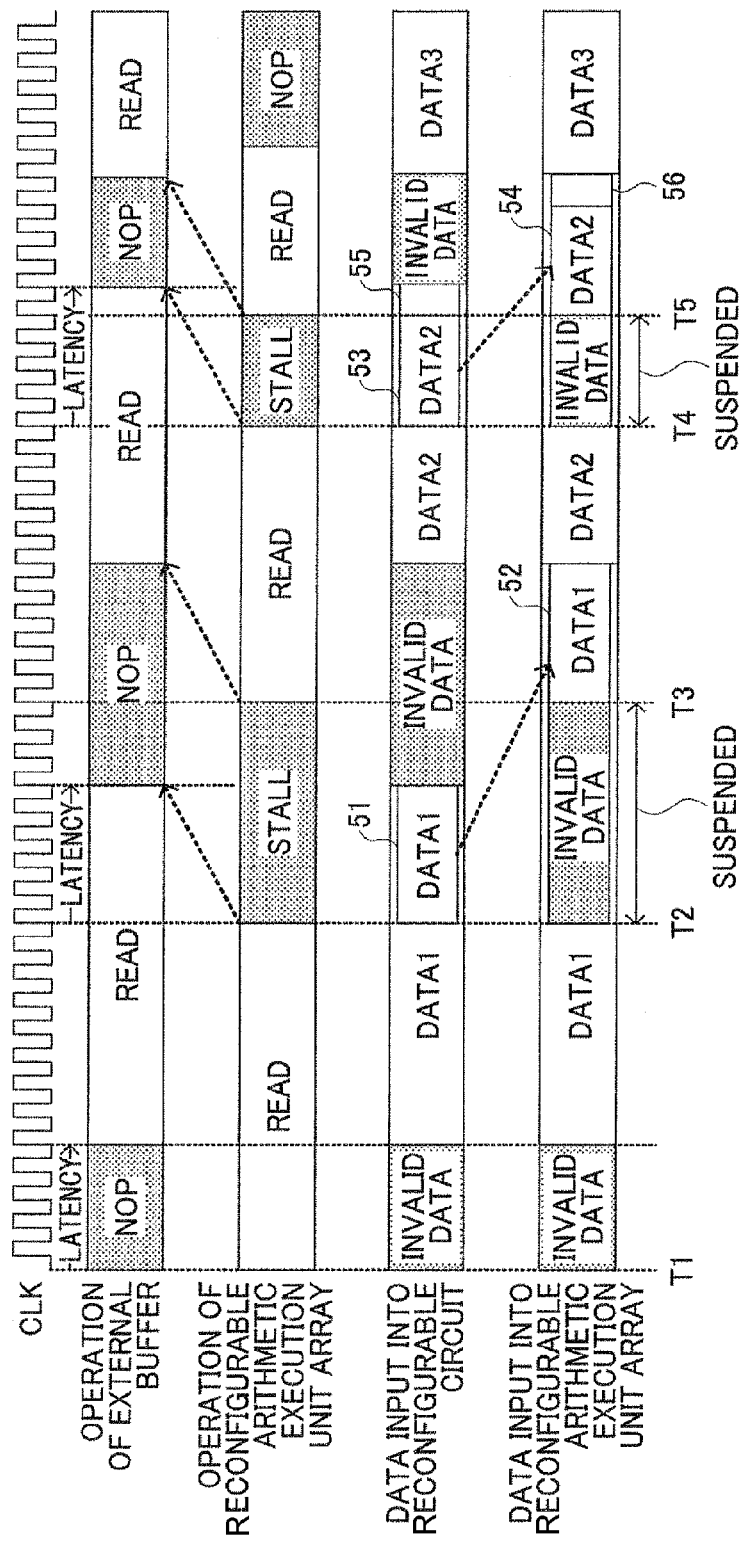
FIG. 10 is a drawing illustrating the way the request control circuit and buffer circuit cooperate with the external buffer when the operation of the reconfigurable arithmetic execution unit array is suspended.

FIG. 10 is a drawing illustrating the way the request control circuit and buffer circuit cooperate with the external buffer when the operation of the reconfigurable arithmetic execution unit array is suspended. FIG. 10 illustrates operations performed by relevant units when an operation stall request is generated during the period in which the reconfigurable arithmetic execution unit array 12 illustrated in FIG. 1 is reading the external buffer 11. In response to the assertion of the stall signal STALL by the suspension control circuit 13, the operation of the reconfigurable arithmetic execution unit array 12 comes to a halt, and the request control circuit 16 negates the valid-state indicating signal VOUT. Accordingly, no read request is made to the external buffer 11 after the suspension of computation operation of the reconfigurable arithmetic execution unit array 12.

In row (a) of FIG. 10, a clock signal CLK is illustrated. As illustrated in row (c), the reconfigurable arithmetic execution unit array 12 asserts a read request from timing T1 to timing T2. As illustrated in row (b), the external buffer supplies read data after a latency of 5 cycles. The data supplied by this read data supply operation are received as reconfigurable circuit input data DATA1 illustrated in row (d) of FIG. 10. As illustrated in row (c), the reconfigurable arithmetic execution unit array 12 suspends its operation, and the read request to the external buffer 11 is suspended. In response to the read request asserted prior to timing T2, however, DATA1 is supplied as illustrated in row (d) from the external buffer 11 to the reconfigurable circuit 10 as input data during the period of 5 cycles starting at T2. The buffer circuit 14 stores the input data DATA1 of these 5 cycles as buffer data 51. At this time, the count value of the counter 31 is counted up to 5.

As illustrated in row (c), the reconfigurable arithmetic execution unit array 12 resumes its arithmetic operation at timing T3. Along with this, the request control circuit 16 places the valid-state indicating signal VOUT in an asserted state to resume a read request made to the external buffer 11. In the buffer circuit 14, as previously described, the selector 35 selects an output of the shift-register 33 and supplies the selected output to the reconfigurable arithmetic execution unit array 12 when the output count value of the counter 31 is no smaller than 1. Accordingly, during the period of 5 cycles from timing T3, the buffer data DATA1 stored in the shift-register 33 are successively supplied to the reconfigurable arithmetic execution unit array 12 as input data 52. The counter 31 of the buffer circuit 14 counts down during these 5 cycles, so that the count value eventually becomes 0. The selector 35 selects data supplied from the external buffer 11 for provision to the reconfigurable arithmetic execution unit array 12 when the output count value of the counter 31 becomes 0. Accordingly, read data DATA2 retrieved from the external buffer 11 in the sixth cycle from T3 in response to the resumed read request at timing T3 is supplied to the reconfigurable arithmetic execution unit array 12 via the buffer circuit 14. Due to this operation of the buffer circuit 14, the data read from the external buffer 11 are successively supplied to the reconfigurable arithmetic execution unit array 12 without being lost.

As illustrated in row (c), further, the reconfigurable arithmetic execution unit array 12 suspends its operation at timing 14, and the read request to the external buffer 11 is suspended. In response to the read request asserted prior to timing T4, however, DATA2 is supplied as illustrated in row (d) from the external buffer 11 to the reconfigurable circuit 10 as input data during the period of 5 cycles starting at 14. The buffer circuit 14 stores the input data DATA2 of these 5 cycles as buffer data 53 55. As illustrated in row (c), however, the reconfigurable arithmetic execution unit array 12 resumes its arithmetic operation at timing 15. The resuming of operation at T5 occurs in the fourth cycle from the suspension of operation at 14 that is within the 5 cycles. At this timing, thus, the input data DATA2 for 4 cycles are stored as the buffer data 53 in the buffer circuit 14. The count value of the counter 31 of the buffer circuit 14 is 4 at the time of resuming the operation at T5, Accordingly, during the period of 4 cycles from timing T5, the buffer data 53 for 4 cycles already stored in the shift-register 33 at timing T5 are successively supplied to the reconfigurable arithmetic execution unit array 12 as input data 54. In the cycle immediately after T5, both data reading from the shift-register 33 and a shift operation occur concurrently. The input data of the fifth cycle from T4 is stored as the buffer data 55 in the buffer circuit 14. At this time, the count value of the counter 31 of the buffer circuit 14 is maintained at 4. After this, the count value goes down from 4 to 0 during the period of the second cycle to the fifth cycle from T5. In the fifth cycle from timing T5, the buffer data 55 stored in the buffer circuit 14 in the cycle immediately after T5 is supplied to the reconfigurable arithmetic execution unit array 12 as input data 56. The selector 35 selects data supplied from the external buffer 11 for provision to the reconfigurable arithmetic execution unit array 12 when the output count value of the counter 31 becomes 0. Accordingly, read data DATA3 retrieved from the external buffer 11 in the sixth cycle from T5 in response to the resumed read request at timing T5 is supplied to the reconfigurable arithmetic execution unit array 12 via the buffer circuit 14. Due to this operation of the buffer circuit 14, the data read from the external buffer 11 are successively supplied to the reconfigurable arithmetic execution unit array 12 without being lost.

The operations illustrated in FIG. 10 are applicable to both the case of the internal stall request IN-STALL being the cause of a stall request and the case of the external stall request EXT-STALL being the cause of a stall request. The cause by which the external stall request EXT-STALL is generated by the external buffer 11 may include a case in which a read request is made to the external buffer 11 before a data store operation in the external buffer 11 is not yet completed, for example.

Figure 11:
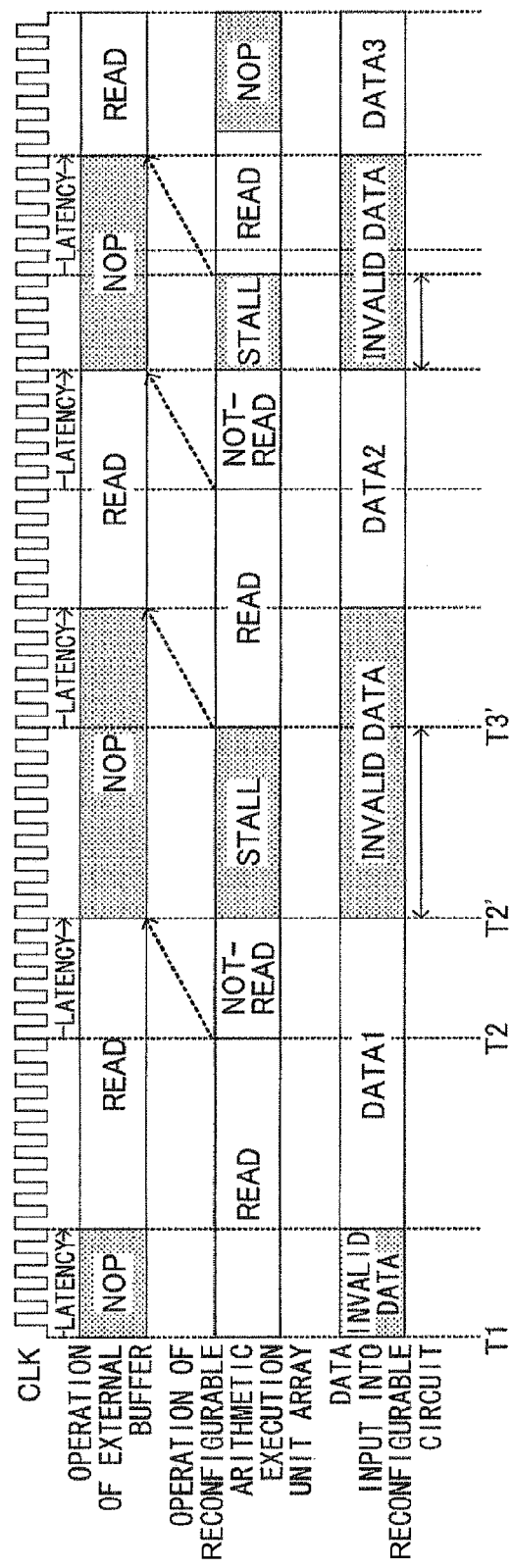
FIG. 11 is a drawing illustrating an operation for properly reading data in a configuration in which neither the buffer circuit nor the request control circuit is provided, for the purpose of comparison with the operations illustrated in FIG. 10.

FIG. 11 is a drawing illustrating an operation for properly reading data in a configuration in which neither the buffer circuit nor the request control circuit is provided, for the purpose of comparison with the operations illustrated in FIG. 10. Similarly to the manner illustrated in FIG. 10, a stall request occurs at timing T2. If the operation of the reconfigurable arithmetic execution unit array is immediately suspended, however, the loading of read data will fail as explained in connection with FIG. 6. In order to avoid this, in the example illustrated in FIG. 11, the operation of the reconfigurable arithmetic execution unit array is suspended at timing T2' after waiting for 5 cycles to account for the latency upon the occurrence of the stall request. The read request to the external buffer is negated at timing T2 at which the stall request is made, so that data reading from the external buffer is completed by the timing T2'. Accordingly, no read data is lost even though the operation of the reconfigurable arithmetic execution unit array is suspended from timing T2' to timing T3'. It may be possible to control operations as illustrated in FIG. 11 such as to properly read data by negating a read request ahead of the delayed suspension of operation of the reconfigurable arithmetic execution unit array. In the case of the operations illustrated in FIG. 11, the suspension of operation of the reconfigurable arithmetic execution unit array is delayed from T2 to T2', compared to the operations illustrated in FIG. 10. Accordingly, the timing of resuming the operation is also delayed. It follows that the operation of the reconfigurable circuit is cumulatively delayed each time its operation is suspended, thereby resulting in the reduction of processing performance. The configuration illustrated in FIG. 1 is provided with the buffer circuit 14 and the request control circuits 15 and 16, which serve to avoid delaying the suspension of operation of the reconfigurable arithmetic execution unit array 12, thereby achieving high processing performance.

Figure 12:
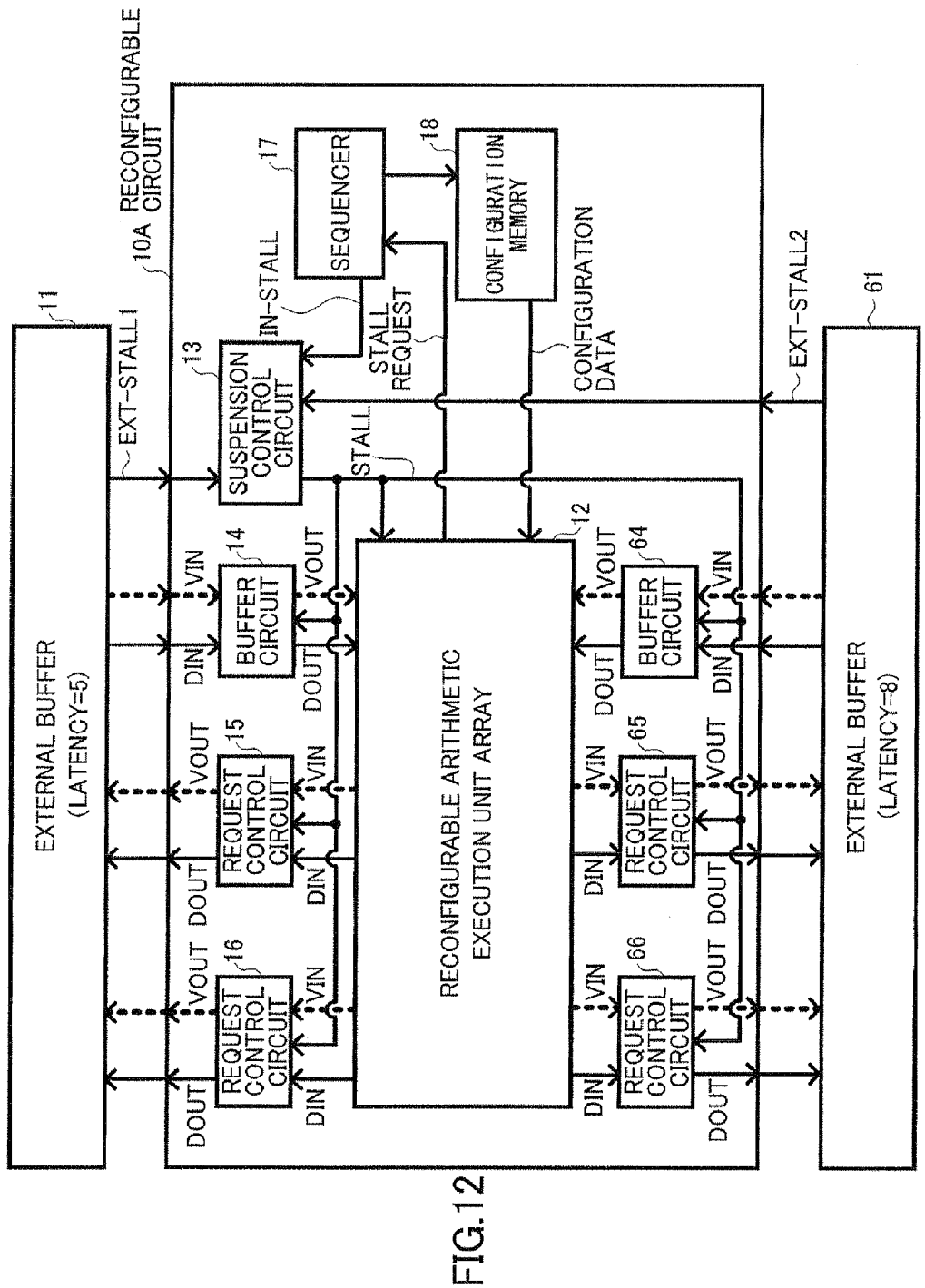
FIG. 12 is a drawing illustrating a variation of the configuration of the reconfigurable circuit system.

FIG. 12 is a drawing illustrating a variation of the configuration of the reconfigurable circuit system. In FIG. 12, the same elements as those of FIG. 1 are referred to by the same numerals, and a description thereof will be omitted. The reconfigurable circuit system illustrated in FIG. 12 includes a reconfigurable circuit 10A, an external buffer 11, and an external buffer 61. The external buffer 11 has a read latency of 5 clock cycles, for example, and the external buffer 61 has a read latency of 8 clock cycles, for example.

The reconfigurable circuit 10A includes a buffer circuit 64, a request control circuit 65, and a request control circuit 66 in addition to the configuration of the reconfigurable circuit 10 illustrated in FIG. 1. The buffer circuit 64, the request control circuit 65, and the request control circuit 66 may have configurations identical to the configurations of the buffer circuit 14, the request control circuit 15, and the request control circuit 16, respectively. Similarly to the manner in which the buffer circuit 14, the request control circuit 15, and the request control circuit 16 control read and write operations with respect to the external buffer 11, the buffer circuit 64, the request control circuit 65, and the request control circuit 66 control read and write operations with respect to the external buffer 61.

Upon the assertion of the stall signal STALL, the control of the external buffer 61 is similar to the control of the external buffer 11 regardless of the cause of the stall request. The control of the external buffer 11 and the control of the external buffer 61 are performed independently of each other. Read data for 5 cycles are buffered in the buffer circuit 14 due to the fact that the latency of the external buffer 11 is 5 cycles. Read data for 8 cycles are buffered in the buffer circuit 64 due to the fact that the latency of the external buffer 61 is 8 cycles. Buffering of data read from the external buffers and the supply of the data to the reconfigurable arithmetic execution unit array 12 differ only in the number of stored data, which is 5 in the case of the external buffer 11, and 8 in the case of the external buffer 61. Operations similar to those illustrated in FIG. 10 are performed for both of the buffers.

In this manner, proper read operations are performed with respect to external buffers at the time of suspending the operation of the reconfigurable arithmetic execution unit array 12 even when a plurality of external buffers are connected to the reconfigurable circuit 10. The example illustrated in FIG. 12 is directed to a case in which two external buffers are provided. The number of external buffers is not limited to 2, and any number of external buffers may be provided.

According to at least one embodiment of the present disclosures, a buffer circuit temporarily stores data supplied from an external source during the suspension of operation of a reconfigurable arithmetic execution unit array, and supplies the stored data to the reconfigurable arithmetic execution unit array upon the resumption of operation of the reconfigurable arithmetic execution unit array. With this arrangement, the reconfigurable circuit properly exchanges data with the external buffer when its internal operation is suspended.

Further, the present invention is not limited to these embodiments, but various variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A reconfigurable circuit comprising:
   a reconfigurable arithmetic execution unit array comprising:
   a plurality of arithmetic execution units, and
   a network circuit configured to provide reconfigurable connections between the arithmetic execution units;

a suspension control circuit configured to control suspension and resumption of operation of the reconfigurable arithmetic execution unit array; and a buffer circuit comprising:
  a counter configured to output a count value;
  a temporary storage unit; and
  a selector configured to:
    supply the reconfigurable arithmetic execution unit array with a first data from an external buffer in response to the count value being equal to zero; and
    supply the reconfigurable arithmetic execution unit array with a second data from the temporary storage unit in response to the count value being equal to one or larger than one.

2. The reconfigurable circuit of claim 1, further comprising an access request disabling circuit configured to disable a data access request from the reconfigurable arithmetic execution unit array to the external buffer upon suspension of the operation of the reconfigurable arithmetic execution unit array.

3. The reconfigurable circuit of claim 2, wherein the buffer circuit comprises:
  a number specifying register configured to store data indicative of a number; and
  a shift register configured to store N data items supplied from the external buffer from a moment at which the operation of the reconfigurable arithmetic execution unit array is suspended, N being an integer equal to the number indicated by the data stored in the number specifying register.

4. The reconfigurable circuit of in claim 1, wherein the counter is configured to:
  count up the count value in response to a first clock signal that is synchronized with a shift operation of the shift register during a suspended period of the operation of the reconfigurable arithmetic execution unit array;
  maintain the count value at a current value in the absence of the shift operation of the shift register during the suspended period of the operation of the reconfigurable arithmetic execution unit array; and
  count down the count value in response to a second clock signal in the absence of the shift operation of the shift register during an operating period of the reconfigurable arithmetic execution unit array.

5. The reconfigurable circuit of claim 1, wherein the suspension control circuit is configured to suspend the operation of the reconfigurable arithmetic execution unit array in response to at least one of a stall request from the reconfigurable arithmetic execution unit array and a stall request from the external buffer.

6. The reconfigurable circuit of claim 1, wherein the buffer circuit comprises:
  a first buffer circuit configured to:
    temporarily store a third data supplied from a first external buffer upon suspension of the operation of the reconfigurable arithmetic execution unit array, and
    supply the third data to the reconfigurable arithmetic execution unit array upon resumption of the operation of the reconfigurable arithmetic execution unit array; and
  a second buffer circuit configured to:
    temporarily store a fourth data supplied from a second external buffer upon suspension of the operation of the reconfigurable arithmetic execution unit array; and
    supply the fourth data to the reconfigurable arithmetic execution unit array upon resumption of the operation of the reconfigurable arithmetic execution unit array.

7. The reconfigurable circuit of claim 1, wherein the first data or the second data comprises:
  data having a valid value or an invalid value; and
  valid-state indicating data that indicates whether the data that assumes either a valid value or an invalid value is a valid value or an invalid value.

8. A reconfigurable circuit system comprising:
a reconfigurable circuit; and
an external buffer for which the reconfigurable circuit performs a data read operation and a data write operation,
wherein the reconfigurable circuit comprises:
  a reconfigurable arithmetic execution unit array including:
    a plurality of arithmetic execution units, and
    a network circuit configured to provide reconfigurable connections between the arithmetic execution units;
  a suspension control circuit configured to control suspension and resumption of operation of the reconfigurable arithmetic execution unit array; and
  a buffer circuit comprising:
    a counter configured to output a count value;
    a temporary storage unit; and
    a selector configured to:
      supply the reconfigurable arithmetic execution unit array with a first data from an external buffer in response to the count value being equal to zero; and
      supply the reconfigurable arithmetic execution unit array with a second data from the temporary storage unit in response to the count value being equal to one or larger than one.

9. The reconfigurable circuit system of claim 8, further comprising an access request disabling circuit configured to disable a data access request from the reconfigurable arithmetic execution unit array to the external buffer upon suspension of the operation of the reconfigurable arithmetic execution unit array.

10. The reconfigurable circuit system of claim 9, wherein the buffer circuit comprises:
  a number specifying register configured to store data indicative of a number; and
  a shift register configured to store N data items supplied from the external buffer from a moment at which the operation of the reconfigurable arithmetic execution unit array is suspended, N being an integer equal to the number indicated by the data stored in the number specifying register.

11. The reconfigurable circuit system of claim 10, wherein the counter is configured to:
  count up the count value in response to a first clock signal that is synchronized with a shift operation of the shift register during a suspended period of the operation of the reconfigurable arithmetic execution unit array;
  maintain the count value at a current value in the absence of the shift operation of the shift register during the suspended period of the operation of the reconfigurable arithmetic execution unit array; and
  count down the count value in response to a second clock signal in the absence of the shift operation of the shift register during an operating period of the reconfigurable arithmetic execution unit array.

12. The reconfigurable circuit system of claim 8, wherein the suspension control circuit is configured to suspend the operation of the reconfigurable arithmetic execution unit array in response to at least one of a stall request from the reconfigurable arithmetic execution unit array and a stall request from the external buffer.

13. The reconfigurable circuit system of claim 8, wherein the buffer circuit comprises:
   a first buffer circuit configured to:
      temporarily store a third data supplied from a first external buffer upon suspension of the operation of the reconfigurable arithmetic execution unit array, and
      supply the third data to the reconfigurable arithmetic execution unit array upon resumption of the operation of the reconfigurable arithmetic execution unit array; and
   a second buffer circuit configured to:
      temporarily store a fourth data supplied from a second external buffer upon suspension of the operation of the reconfigurable arithmetic execution unit array; and
   supply the fourth data to the reconfigurable arithmetic execution unit array upon resumption of the operation of the reconfigurable arithmetic execution unit array.

14. The reconfigurable circuit system of claim 8, wherein the first data or the second data comprises:
   data having a valid value or an invalid value; and
   valid-state indicating data that indicates whether the data that assumes either a valid value or an invalid value is a valid value or an invalid value.

15. A method of controlling a reconfigurable circuit comprising:
   suspending an operation of a reconfigurable arithmetic execution unit array including a plurality of arithmetic execution units and a network circuit configured to provide reconfigurable connections between the arithmetic execution units;
   disabling a data access request from the reconfigurable arithmetic execution unit array to an external buffer simultaneously with the suspension of the operation of the reconfigurable arithmetic execution unit array;
   storing data in a temporary storage in a buffer circuit during a suspended period of the operation of the reconfigurable arithmetic execution unit array;
   supplying the reconfigurable arithmetic execution unit array with a first data from an external buffer in response to a count value being equal to zero; and
   supplying the reconfigurable arithmetic execution unit array with a second data from a temporary storage unit in a buffer circuit in response to the count value being equal to one or larger than one.

* * * * *